(12) United States Patent
Schraut

(10) Patent No.: US 12,472,894 B2
(45) Date of Patent: Nov. 18, 2025

(54) DEVICE FOR A SEAT, SEAT AND VEHICLE HAVING SUCH A DEVICE, AND METHOD FOR PLAYING BACK MEDIA CONTENT

(71) Applicant: Bayerische Motoren Werke Aktiengesellschaft, Munich (DE)

(72) Inventor: Michael Schraut, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 364 days.

(21) Appl. No.: 17/060,222

(22) Filed: Oct. 1, 2020

(65) Prior Publication Data
US 2021/0122241 A1   Apr. 29, 2021

(30) Foreign Application Priority Data

Oct. 25, 2019 (DE) ...................... 10 2019 128 880.0

(51) Int. Cl.
*B60R 16/037* (2006.01)
*B60K 35/10* (2024.01)
(Continued)

(52) U.S. Cl.
CPC ............ *B60R 16/037* (2013.01); *B60K 35/10* (2024.01); *B60K 35/22* (2024.01); *B60K 35/26* (2024.01);
(Continued)

(58) Field of Classification Search
CPC .............. B60K 35/00; B60K 2370/152; B60K 2370/56; B60K 2370/58; B60K 2370/73; B60K 2370/563; B60K 2370/573; B60K 2370/586; B60K 2370/834; B60K 37/04; B60K 2370/175; B60K 35/10;
(Continued)

(56) References Cited

U.S. PATENT DOCUMENTS

2006/0075934 A1\* 4/2006 Ram .................. B64D 11/0015
108/44
2007/0289800 A1   12/2007 Aoki et al.
(Continued)

FOREIGN PATENT DOCUMENTS

CN          1706314 A     12/2005
CN        101093163 A     12/2007
(Continued)

OTHER PUBLICATIONS

German-language Office Action issued in German Application No. 10 2019 128 880.0 dated Jun. 24, 2020 (five (5) pages).
(Continued)

*Primary Examiner* — Douglas Wilson
(74) *Attorney, Agent, or Firm* — Crowell & Moring LLP

(57) ABSTRACT

A device for a seat, includes: a docking unit that is designed for connection to a mobile terminal in order to allow a data transfer from the mobile terminal to at least one media unit; and a control unit that is designed to record at least one context parameter that specifies a current surroundings situation of the device; and to actuate at least one functional unit based on the at least one context parameter in order to adjust a setting of the at least one functional unit to the current surroundings situation such that a user is able to use the at least one media unit.

14 Claims, 1 Drawing Sheet

(51) Int. Cl.
  *B60K 35/22* (2024.01)
  *B60K 35/26* (2024.01)
  *B60K 35/28* (2024.01)
  *B60K 35/50* (2024.01)
  *B60K 35/80* (2024.01)
  *B60Q 3/70* (2017.01)
  *B60R 11/02* (2006.01)
  *B64D 11/00* (2006.01)
  *G06F 1/16* (2006.01)
  *H04N 21/414* (2011.01)
  *H04N 21/4363* (2011.01)
  *B60K 35/85* (2024.01)
  *B60N 2/90* (2018.01)

(52) U.S. Cl.
  CPC .............. B60K 35/50 (2024.01); B60K 35/80 (2024.01); B60R 11/0264 (2013.01); *B60K 35/28* (2024.01); *B60K 35/85* (2024.01); *B60K 2360/175* (2024.01); *B60K 2360/56* (2024.01); *B60K 2360/563* (2024.01); *B60K 2360/573* (2024.01); *B60K 2360/834* (2024.01); *B60N 2/90* (2018.02); *B60Q 3/735* (2022.05); *B60Q 2800/10* (2022.05); *B64D 11/0015* (2013.01); *B64D 11/00155* (2014.12); *G06F 1/1632* (2013.01); *H04N 21/41422* (2013.01); *H04N 21/43637* (2013.01)

(58) Field of Classification Search
  CPC ........ B60K 35/22; B60K 35/28; B60K 35/50; B60K 35/80; B60K 35/85; B60K 2360/175; B60K 2360/56; B60K 2360/563; B60K 2360/573; B60K 2360/834; B60R 11/0264; B60R 16/037; B60R 16/02; B60R 11/0241; B60R 11/0252; H04N 21/41422; H04N 21/4122; H04N 21/43637; B60N 2/90; G06F 1/1632; B60Q 1/507; B60Q 2800/10; B60Q 3/735; B64D 11/0015; B64D 11/00152; B64D 11/00155
  See application file for complete search history.

(56) References Cited

U.S. PATENT DOCUMENTS

| | | |
|---|---|---|
| 2011/0167460 A1 | 7/2011 | Tranchina |
| 2011/0237186 A1 | 9/2011 | Preissinger et al. |
| 2012/0162891 A1* | 6/2012 | Tranchina .......... H04N 21/2368 361/679.41 |
| 2014/0237517 A1* | 8/2014 | Tranchina .......... H04N 21/2368 725/62 |
| 2015/0015479 A1 | 1/2015 | Cho |
| 2015/0138449 A1* | 5/2015 | Rawlinson ............. B60N 2/003 348/837 |
| 2015/0363656 A1 | 12/2015 | Brauer |
| 2018/0022359 A1 | 1/2018 | Gusenbauer et al. |
| 2018/0029501 A1 | 2/2018 | Wolf |
| 2018/0244175 A1* | 8/2018 | Tan ...................... B60K 35/00 |
| 2018/0251031 A1 | 9/2018 | Liebau et al. |
| 2019/0016235 A1 | 1/2019 | Parida et al. |
| 2019/0135299 A1 | 5/2019 | Glas |
| 2019/0248263 A1* | 8/2019 | Nagatomi ................ A47B 5/04 |
| 2019/0289285 A1 | 9/2019 | Nashida et al. |
| 2020/0073527 A1* | 3/2020 | Bandishti ............... B60K 35/10 |
| 2020/0312282 A1* | 10/2020 | Akagawa ............... G09G 5/377 |
| 2020/0371733 A1* | 11/2020 | Rao ......................... G06F 3/017 |
| 2021/0323576 A1* | 10/2021 | Hwang ................. B60K 35/00 |
| 2021/0357669 A1* | 11/2021 | Kim ....................... G06V 20/59 |
| 2021/0387507 A1* | 12/2021 | Schleicher ............. H04B 1/036 |
| 2022/0017109 A1* | 1/2022 | Hwang ................ B60Q 1/5035 |
| 2023/0177885 A1* | 6/2023 | Kramer .................... G06F 3/01 348/148 |

FOREIGN PATENT DOCUMENTS

| | | |
|---|---|---|
| CN | 202703426 U | 1/2013 |
| CN | 203914082 U | 11/2014 |
| CN | 104301507 A | 1/2015 |
| CN | 107466223 A | 12/2017 |
| CN | 107466273 A | 12/2017 |
| CN | 108349386 A | 7/2018 |
| CN | 108881706 A | 11/2018 |
| CN | 109153382 A | 1/2019 |
| CN | 109249842 A | 1/2019 |
| CN | 208646752 U | 3/2019 |
| CN | 109716733 A | 5/2019 |
| CN | 109997097 A | 7/2019 |
| DE | 10 2010 002 928 A1 | 9/2011 |
| DE | 10 2017 205 135 A1 | 9/2018 |
| EP | 1 804 233 A1 | 7/2007 |

OTHER PUBLICATIONS

Chinese-language Office Action issued in Chinese Application No. 202010964733.2 dated Apr. 26, 2023 with English translation (17 pages).

Chinese-language Office Action issued in Chinese Application No. 202010964733.2 dated Jul. 20, 2023 with English translation (19 pages).

German-language Office Action issued in German Application No. 10 2019 128 880.0 dated Feb. 18, 2025 (5 pages).

* cited by examiner

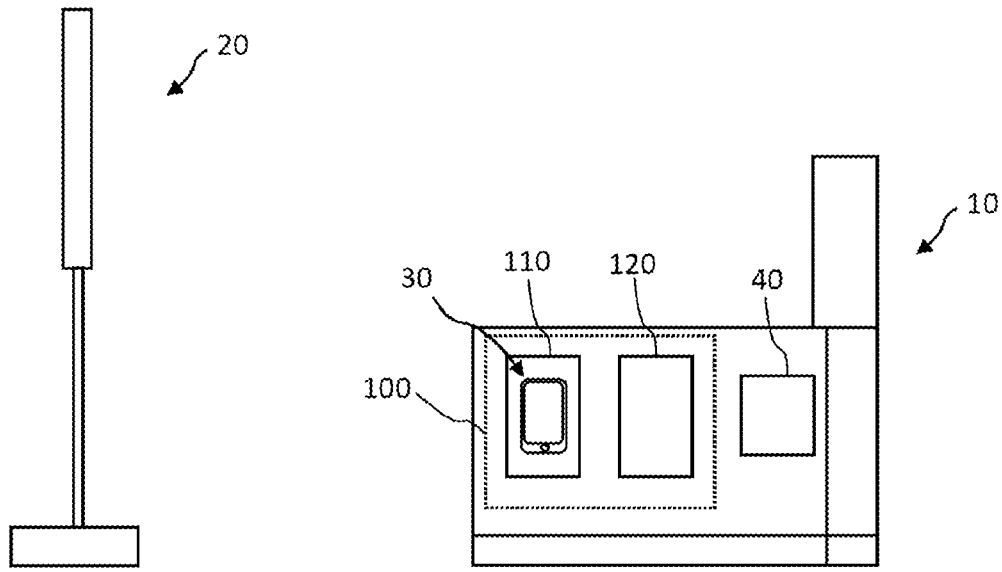

DEVICE FOR A SEAT, SEAT AND VEHICLE HAVING SUCH A DEVICE, AND METHOD FOR PLAYING BACK MEDIA CONTENT

CROSS REFERENCE TO RELATED APPLICATION

This application claims priority under 35 U.S.C. § 119 from German Patent Application No. 10 2019 128 880.0, filed Oct. 25, 2019, the entire disclosure of which is herein expressly incorporated by reference.

BACKGROUND AND SUMMARY OF THE INVENTION

The present disclosure relates to a device for a seat, to a seat having such a device, to a vehicle having such a seat, and to a method for playing back media content. The present disclosure relates in particular to the use of mobile terminals in a position convenient to the user.

Mobile terminals, such as for example smartphones and tablets, are nowadays constant companions and are used for an extremely wide variety of tasks and applications. Mobile terminals may for example also be used as platforms for mobile work, wherein, due to their compact size, they are not overly suitable as a replacement for conventional notebooks. In particular, operating mobile terminals, in particular in the case of complex tasks or applications, is laborious or even impossible. This may lead to discomfort for the user, since said user for example has to switch to his notebook in order to perform certain tasks or to use certain applications.

One object of the present disclosure is to provide a device for a seat, a seat having such a device, a vehicle having such a seat, and a method for playing back media content, all of the above allowing flexible and comprehensive use of mobile terminals. An additional object of the present disclosure is to improve user convenience.

This object is achieved through the subject matter of the independent claims. Advantageous refinements are specified in the dependent claims.

According to one independent aspect of the present disclosure, what is specified is a device for a seat. The device comprises a docking unit that is designed for connection to a mobile terminal in order to allow a data transfer from the mobile terminal to at least one media unit; and a control unit. The control unit is designed to record at least one context parameter that specifies a current surroundings situation of the device; and to actuate at least one functional unit based on the at least one context parameter in order to adjust a setting of the at least one functional unit to the current surroundings situation such that a user is able to use the at least one media unit.

According to the invention, at least one functional unit is set based on the at least one context parameter or depending on the situation such that the user is able to make optimum use of the at least one media unit. By way of example, a position of a display (media unit) may be changed depending on the context, such as for example on a seat position of the user, by way of an actuator (functional unit) such that the user has an optimum view of the display while media content from the mobile terminal is being displayed on the display. It is thus possible for the user to make optimum use of the at least one media unit.

The at least one context parameter preferably relates to an automated driving mode, and in particular an autonomous driving mode.

The term "context parameter" in the context of the present document means a property of a current situation that relates for example to surroundings and/or a user. The context parameter may also be referred to as a "situation parameter". By way of example, the context parameter may specify that the user is sitting upright or leaning back in the seat. In a further example, the context parameter may specify whether or not a vehicle is driving autonomously. The present disclosure is, however, not restricted to these examples and the context parameter may be selected appropriately depending on the field of application in order to allow optimum setting of the at least one functional unit and/or of the at least one media unit.

The term mobile terminal comprises in particular smartphones, but also other mobile telephones or mobiles, personal digital assistants (PDAs), tablet PCs, notebooks, smartwatches and all present and future electronic devices that are equipped for example with technology for loading and executing apps.

In some embodiments, a mobile terminal may, in particular, be a device that is capable of communicating wirelessly in a mobile network via local area networks (LANs), such as for example wireless LAN (Wi-Fi/WLAN), or via wide area networks (WANs), such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), or World Wide Interoperability for Microwave Access (WIMAX). Communication via further present or future communication technologies, for example 5G mobile radio systems, is possible according to the present disclosure.

The docking unit is preferably designed for wireless and/or wired connection to the mobile terminal. The docking unit may be a wireless interface that is designed for example to communicate with the mobile terminal by way of NFC (near field communication), Bluetooth, Wi-Fi or the like. In addition or as an alternative, the docking unit may be a wired interface that is able to be connected to the mobile terminal by way of USB, for example.

In some embodiments, the docking unit is designed to fix the mobile terminal in one position. This may be achieved for example by way of a mechanical holder. In addition or as an alternative, the docking unit may comprise a setting-down surface for the mobile terminal. The setting-down surface may for example comprise a non-slip material such as rubber in order to keep the mobile terminal in one position. In addition or as an alternative, the docking unit may be movable, and in particular rotatable, in order to allow an orientation and/or a position of the docking unit or of the mobile terminal to be set.

The at least one media unit is preferably selected from the group comprising or consisting of a display, a speaker and a communication unit. The at least one media unit may be independent of the mobile terminal, and may therefore also be referred to as an external media unit. The at least one media unit may also be integrated in the seat, or may be provided independently of the seat.

The display may be an LCD display, a plasma display or an OLED display. By way of example, the display may be a television. The communication unit may be designed for voice telephony and/or messaging services (for example SMS) and/or data services.

The at least one functional unit is preferably selected from the group comprising the following or consisting of the following:

a unit for a seat setting;

a unit for setting the at least one media unit, in particular a spatial orientation of the at least one media unit;

a media module for providing media content for the at least one media unit, such as for example a travel sickness avoidance module;

a keypad, in particular a unit for setting a spatial orientation of the keypad; and a unit for setting a spatial orientation of a table.

The at least one functional unit is preferably identical to the at least one media unit. As an alternative, the at least one functional unit may for example be mechanically and/or electrically connected to the at least one media unit. As an alternative, the at least one functional unit may be independent of the at least one media unit.

One example of identically between the at least one functional unit and the at least one media unit may be a speaker. If the context parameter specifies that the user is sitting upright in the seat (for example rather than leaning back), the speaker may be actuated such that an audio output from the speaker is adapted to this context, that is to say the position of the user.

One example of a mechanical connection between the at least one functional unit and the at least one media unit may be a display whose position is able to be set using an actuator. If the context parameter specifies that the user is sitting upright in the seat (for example rather than leaning back), the actuator may be actuated such that a position of the display is adapted appropriately to this context, that is to say the position of the user.

One example of an electrical connection between the at least one functional unit and the at least one media unit may be a display that is connected to a travel sickness avoidance module. If the context parameter specifies that a vehicle is in autonomous driving mode, the travel sickness avoidance module may be actuated such that a display on the display executes a mode that is able to minimize or even prevent the occurrence of travel sickness for the user. This may be achieved for example by dynamically moving pixels/images, showing anchors, etc.

One example of independence of the at least one functional unit from the at least one media unit may be a display and a seat adjuster. If the context parameter specifies that the user is sitting upright in the seat (for example rather than leaning back), the seat may be set by virtue of the seat setting such that the user is able to see the display in an optimum manner.

The present disclosure is however not restricted to the examples mentioned above, and other means may be used in order to ensure that a user is able to make optimum use of the at least one media unit. By way of example, a keypad and/or a setting-down table may be moved into a position that is optimum for the user.

The device is preferably designed to actuate the at least one media unit as an expansion of the mobile terminal. By way of example, the display of the mobile terminal may be expanded onto another display. In other words, the display on the display is not mirrored, but rather expanded.

According to a further independent aspect of the present disclosure, what is specified is a seat. The seat comprises the device according to the embodiments described in this document.

The seat may be for example a vehicle seat, an item of household furniture (for example an armchair or a couch), an aircraft seat, etc. The seat may in particular be a vehicle seat that is installed in a vehicle, in particular a motor vehicle.

According to a further independent aspect of the present disclosure, what is specified is a vehicle, in particular a motor vehicle, comprising the device and/or the seat according to the embodiments described in this document.

The term vehicle comprises passenger vehicles, trucks, buses, RVs, motorcycles, etc. that are used to transport people, goods, etc. The term in particular comprises motor vehicles for transporting people.

In some embodiments, the vehicle comprises a driver assistance system for automated driving. A self-driving vehicle steers and/or brakes and/or accelerates independently based on a driving strategy. The driving strategy may be determined based on surroundings data from the surroundings sensor system, road state, traffic conditions, weather conditions, etc. The determined driving strategy is implemented by the drive, the steering system and/or the brakes.

According to a further independent aspect of the present disclosure, what is specified is a method for playing back media content. The method comprises connecting a docking unit on a seat to a mobile terminal in order to allow a data transfer from the mobile terminal to at least one media unit; recording at least one context parameter that specifies a current surroundings situation; and actuating at least one functional unit based on the at least one context parameter in order to adjust a setting of the at least one functional unit to the current surroundings situation such that a user is able to use the at least one media unit.

The method may implement the aspects of the device described in this document.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 schematically shows a device for a seat according to embodiments of the present disclosure.

FIG. 2 is a flowchart of a method for playing back media content according to embodiments of the present disclosure.

The same reference signs are used below for identical and functionally identical elements, unless indicated otherwise.

DETAILED DESCRIPTION OF THE DRAWINGS

FIG. 1 schematically shows a device 100 for a seat 10 according to embodiments of the present disclosure. The device 100 may be integrated in the seat 10 in some embodiments.

The seat 10 may be for example a vehicle seat, an item of household furniture (for example an armchair or a couch), an aircraft seat, etc. The seat 10 may in particular be a vehicle seat that is installed in a vehicle, in particular a motor vehicle.

The device 100 comprises a docking unit 110 that is designed for connection to a mobile terminal 30 in order to allow a data transfer from the mobile terminal 30 to at least one media unit 20. The mobile terminal 30 may be for example a smartphone, personal digital assistant (PDA), tablet PC, notebook, a smartwatch or another electronic device.

The docking unit 110 may be designed for wireless and/or wired connection to the mobile terminal 30. The docking unit 110 may be a wireless interface that is designed for example to communicate with the mobile terminal 30 by way of NFC (near field communication), Bluetooth, Wi-Fi or the like. In addition or as an alternative, the docking unit 110 may be a wired interface that is able to be connected to the mobile terminal 30 by way of USB, for example.

The connection between the docking unit 110 and the mobile terminal 30 may be produced automatically, for example when the mobile terminal 30 is plugged into the docking unit 110 or set down on the docking unit 110.

In some embodiments, the docking unit 110 is designed to fix the mobile terminal 30 in one position. This may be achieved for example by way of a mechanical holder. In addition or as an alternative, the docking unit 110 may comprise a setting-down surface for the mobile terminal 30. The setting-down surface may for example be a substantially horizontal setting-down surface and/or may comprise a non-slip material such as rubber in order to keep the mobile terminal 30 in one position.

The mobile terminal 30 performs a data transfer from the mobile terminal 30 to at least one media unit 20. The at least one media unit 20 may be for example a display, a speaker and/or a communication unit. The at least one media unit 20 may be independent of the mobile terminal 30 or seat 10, as illustrated in the example of FIG. 1. As an alternative, the at least one media unit may be integrated in the seat 10.

In some embodiments, two or more media units may be provided. Each of the two or more media units may be independent of the mobile terminal 30 or seat 10. As an alternative, each of the two or more media units may be integrated in the seat 10. In a further alternative embodiment, at least one media unit of the two or more media units may be independent of the mobile terminal 30 or seat 10, and at least one media unit of the two or more media units may be integrated in the seat 10.

The at least one media unit 20 may serve as or be configured as an expansion of a media output of the mobile terminal 30. By way of example, the display of the mobile terminal 30 may be expanded onto another display. In other words, the display on the display of the mobile terminal 30 is not mirrored, but rather expanded.

The device 100 furthermore comprises a control unit 120. The control unit 120 is designed to record at least one context parameter that specifies a current surroundings situation of the device. The context parameter specifies a property of a current situation that relates for example to surroundings and/or a user. By way of example, the context parameter may specify that the user is sitting upright or leaning back in the seat. In a further example, the context parameter may specify whether or not a vehicle is driving autonomously. The context parameter may be recorded by way of suitable means, such as for example a camera that records a position of the user, a position sensor of a seat setting device that records a position of a backrest of the seat 10, etc.

The control unit 120 is furthermore designed to actuate at least one functional unit 40 based on the at least one context parameter in order to adjust a setting of the at least one functional unit 40 to the current surroundings situation such that a user is able to make optimum use of the at least one media unit 20. The at least one functional unit 40 may be integrated in the seat 10 in some embodiments. In other embodiments, the at least one functional unit 40 may be provided independently of the seat 10. In the latter case, the at least one functional unit may be referred to as an external functional unit.

The at least one functional unit 40 may be for example a unit for a seat setting, a unit for setting the at least one media unit 20, in particular a spatial orientation of the at least one media unit 20, a media module for providing media content for the at least one media unit 20, such as for example a travel sickness avoidance module, a keypad, in particular a unit for setting a spatial orientation of the keypad, or a unit for setting a spatial orientation of a table.

In some embodiments, the at least one functional unit is identical to the at least one media unit. As an alternative thereto, the at least one functional unit may for example be mechanically and/or electrically connected to the at least one media unit. In a further alternative embodiment, the at least one functional unit may be independent of the at least one media unit.

One example of identically between the at least one functional unit and the at least one media unit may be a speaker. If the context parameter specifies that the user is sitting upright in the seat (for example rather than leaning back), the speaker may be actuated such that an audio output from the speaker is adapted to this context, that is to say the position of the user.

One example of a mechanical connection between the at least one functional unit and the at least one media unit may be a display or table whose position is able to be set using an actuator. If the context parameter specifies that the user is sitting upright in the seat (for example rather than leaning back), the actuator may be actuated such that a position of the display or table is adapted to this context, that is to say the position of the user.

One example of an electrical connection between the at least one functional unit and the at least one media unit may be a display (media unit) that is connected to a travel sickness avoidance module (functional unit). If the context parameter specifies that a vehicle is in autonomous driving mode, the travel sickness avoidance module may be actuated such that a display on the display executes a mode that is able to minimize or even prevent the occurrence of travel sickness for the user. This may be achieved for example by dynamically moving pixels/images, showing anchors, etc.

One example of independence of the at least one functional unit from the at least one media unit is a display and a seat adjuster. If the context parameter specifies that the user is sitting upright in the seat (for example rather than leaning back), the seat may be set by virtue of the seat setting such that the user is able to see the display in an optimum manner.

The present disclosure is not restricted to the examples mentioned above, and other means may be used in order to ensure that a user is able to make optimum use of the at least one media unit 20. By way of example, a keypad and/or a setting-down table may be moved into a position that is optimum for the user.

FIG. 2 shows a flowchart of a method 200 for playing back media content according to embodiments of the present disclosure.

The method 200 comprises, in block 210, connecting a docking unit on a seat to a mobile terminal in order to allow a data transfer from the mobile terminal to at least one media unit; in block 220, recording at least one context parameter that specifies a current surroundings situation; and, in block 230, actuating at least one functional unit based on the at least one context parameter in order to adjust a setting of the at least one functional unit to the current surroundings situation such that a user is able to use the at least one media unit.

The mobile terminal may for example be placed onto a rotatable and non-slip setting-down surface and coupled automatically. The setting-down surface may be arranged next to the seat and be able to be rotated and moved as desired in order to bring it into a convenient operating position. The setting-down surface itself may in this case be used both to operate the seat position and table position and for coupling or disconnection purposes (smart material). The setting-down surface may incorporate a larger display on which the content of the mobile terminal is able to be displayed and/or operated.

Depending on external events (for example a server brings coffee or the seat moves over a toll booth in the vehicle), NFC may be used to make direct payment. An additional app on the mobile terminal may interact directly with the seat or vehicle and automatically adjust it in certain situations (seat heating, reclined position, table position, etc.). The app may additionally also use external data to display events on the mobile terminal (for example notify an end of automated driving, smart home events, ordering, doorbell, etc.). Without coupling, the integrated display may also display local content, such as for example menus, etc.

According to the invention, at least one functional unit is set based on the at least one context parameter or depending on the situation such that the user is able to make optimum use of the at least one media unit. By way of example, a position of a display (media unit) may be changed depending on the context, such as for example on a seat position of the user, by way of an actuator (functional unit) such that the user has an optimum view of the display while media content from the mobile terminal is being displayed on the display. It is thus possible for the user to make optimum use of the at least one media unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for a seat, comprising:
   a docking unit that is configured for connection to a mobile terminal in order to allow a data transfer from the mobile terminal to at least one media unit, wherein the at least one media unit comprises a speaker; and
   a control unit that is configured to:
      record at least one context parameter that specifies a current surroundings situation of the device, wherein the at least one context parameter indicates whether a user is sitting upright in the seat or leaning back in the seat; and
      actuate at least one functional unit based on the at least one context parameter in order to adjust a setting of the at least one functional unit to the current surroundings situation such that a user is able to use the at least one media unit, wherein, when the at least one context parameter indicates that the user is sitting upright in the seat, the speaker is actuated such that an audio output from the speaker is adapted to a position of the user,
   wherein the docking unit comprises a setting-down surface having a non-slip material to keep the mobile terminal in one position,
   wherein the docking unit is integrated with the seat, and
   wherein the docking unit is at least one of movable or rotatable with respect to the seat.

2. The device according to claim 1, wherein the docking unit is configured for wireless and/or wired connection to the mobile terminal.

3. The device according to claim 1, wherein the at least one media unit further comprises at least one of a display or a communication unit.

4. The device according to claim 1, wherein the at least one functional unit further comprises at least one of:
   a unit for setting a spatial orientation of the at least one media unit,
   a unit for a seat setting; or
   a media unit for providing media content for the at least one media unit.

5. The device according to claim 1, wherein the at least one functional unit further comprises the at least one media unit.

6. The device according to claim 1, wherein the at least one context parameter relates to an automated driving mode.

7. The device according to claim 1, wherein the device is configured to actuate the at least one media unit as an expansion of the mobile terminal.

8. A seat comprising the device according to claim 1.

9. The seat according to claim 8, wherein the seat is a vehicle seat.

10. A vehicle comprising the device according to claim 1 and a seat.

11. The device according to claim 1, wherein the at least one functional unit further comprises a unit for setting a spatial orientation of a keypad.

12. The device according to claim 1, wherein the at least one functional unit further comprises a unit for setting a spatial orientation of a table.

13. The device according to claim 1, wherein the at least one functional unit comprises a travel sickness avoidance module that is configured to adjust a display of the at least one media unit to minimize or prevent travel sickness for the user.

14. A method for playing back media content, comprising:
   connecting a docking unit integrated with a seat to a mobile terminal in order to allow a data transfer from the mobile terminal to at least one media unit, wherein the at least one media unit comprises a speaker;
   recording at least one context parameter that specifies a current surroundings situation, wherein the at least one context parameter indicates whether a user is sitting upright in the seat or leaning back in the seat; and
   actuating at least one functional unit based on the at least one context parameter in order to adjust a setting of the at least one functional unit to the current surroundings situation such that a user is able to use the at least one media unit, wherein, when the at least one context parameter indicates that the user is sitting upright in the seat, the speaker is actuated such that an audio output from the speaker is adapted to a position of the user,
   wherein the docking unit comprises a setting-down surface having a non-slip material to keep the mobile terminal in one position, and
   wherein the docking unit is at least one of movable or rotatable with respect to the seat.

* * * * *